US009889836B2

(12) United States Patent
Mahnkopf et al.

(10) Patent No.: US 9,889,836 B2
(45) Date of Patent: Feb. 13, 2018

(54) ELECTROMECHANICAL BRAKING DEVICE FOR A BRAKING SYSTEM AND BRAKING SYSTEM FOR A VEHICLE

(71) Applicant: Robert Bosch GmbH, Stuttgart (DE)

(72) Inventors: Dirk Mahnkopf, Eglosheim (DE); Andreas Schlichenmaier, Brackenheim-Meimsheim (DE); Stefan Seitz, Waltenhofen (DE); Otmar Bussmann, Abstatt (DE); Bertram Foitzik, Ilsfeld (DE); Thomas Eichhorn, Schwieberdingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/787,059

(22) PCT Filed: May 5, 2014

(86) PCT No.: PCT/EP2014/059112
§ 371 (c)(1),
(2) Date: Oct. 26, 2015

(87) PCT Pub. No.: WO2014/184032
PCT Pub. Date: Nov. 20, 2014

(65) Prior Publication Data
US 2016/0107628 A1    Apr. 21, 2016

(30) Foreign Application Priority Data

May 13, 2013 (DE) .......................... 10 2013 208 672

(51) Int. Cl.
*B60T 13/74* (2006.01)
*B60T 13/575* (2006.01)

(52) U.S. Cl.
CPC .......... *B60T 13/745* (2013.01); *B60T 13/575* (2013.01)

(58) Field of Classification Search
CPC ............................ B60T 13/745; B60T 13/575
See application file for complete search history.

(56) References Cited

U.S. PATENT DOCUMENTS 5,207,488 A * 5/1993 Newton ................... B60T 8/409
 303/113.2
9,061,673 B2 * 6/2015 Weiberle ................. B60T 7/042
(Continued)

FOREIGN PATENT DOCUMENTS

CN 101407218 A 4/2009
CN 102211573 A 10/2011
(Continued)

*Primary Examiner* — Bradley King
(74) *Attorney, Agent, or Firm* — Norton Rose Fulbright US LLP; Gerard Messina

(57) ABSTRACT

An electromechanical braking device for a braking system including a master brake cylinder including an electric motor, an adjustable output rod, and a gear, the electric motor being connected to the output rod at least via the gear so that a power transmission path is present via which a motor output is at least partially transmittable to the output rod so that the output rod is adjustable, the electromechanical braking device including at least one elastic component situated within the power transmission path which is configured so that the at least one elastic component is not compressible below a control point of the electromechanical braking device, but during the occurrence of pressure peaks in the master brake cylinder which are above the control point of the electromechanical braking device, the at least one elastic component is compressible. Also described is a braking system for a vehicle.

13 Claims, 1 Drawing Sheet

(56) References Cited

U.S. PATENT DOCUMENTS

| | | |
|---|---|---|
| 2010/0242469 A1 | 9/2010 | Jungbecker et al. |
| 2011/0048874 A1* | 3/2011 | Vollert .................. B60T 13/745 |
| | | 188/152 |
| 2011/0248557 A1 | 10/2011 | Overzier et al. |
| 2011/0297493 A1 | 12/2011 | Vollert et al. |
| 2015/0076972 A1* | 3/2015 | Leiber .................. B60T 13/741 |
| | | 310/68 B |
| 2016/0101767 A1* | 4/2016 | Charpentier ............ B60T 7/042 |
| | | 303/15 |

FOREIGN PATENT DOCUMENTS

| | | |
|---|---|---|
| DE | 10 2004 050103 | 4/2006 |
| DE | 102009047263 A1 | 6/2010 |
| DE | 20 2010 017 605 | 10/2012 |
| JP | 2012106626 A | 6/2012 |

* cited by examiner

ELECTROMECHANICAL BRAKING DEVICE FOR A BRAKING SYSTEM AND BRAKING SYSTEM FOR A VEHICLE

FIELD OF THE INVENTION

The present invention relates to an electromechanical braking device for a braking system including a master brake cylinder. In addition, the present invention relates to a braking system for a vehicle.

BACKGROUND INFORMATION

Patent document DE 20 2010 017 605 U1 discusses a brake booster, a method, and a device for its operation. The brake booster is configured as an electromechanical brake booster. The brake booster includes an electric motor which is connected to a booster housing of the brake booster with the aid of a rotation-to-translation conversion gear in such a way that a rotary motion of a rotor of the electric motor is convertible into a translational motion of the booster housing. An output rod is also adjustable with the aid of the translational motion of the booster housing in such a way that an internal pressure in at least one chamber of a master brake cylinder situated on the brake booster may be increased.

SUMMARY OF THE INVENTION

The present invention provides an electromechanical braking device for a braking system including a master brake cylinder having the features described herein and a braking system for a vehicle having the features described herein.

The present invention makes possible an electromechanical braking device which has a significantly reduced rigidity compared to conventional electromechanical braking devices in the event of an occurrence of pressure peaks in the master brake cylinder of the braking system. In particular, the electromechanical braking device according to the present invention combines the advantages of a good controllability based on its configuration including the electric motor and a low rigidity in the event of the occurrence of pressure peaks in the master brake cylinder. The significantly reduced rigidity of the electromechanical braking device may be used in particular for compensating for a return volume during an ABS control. Therefore, an arising return volume may be accommodated flexibly. In this way, it may be ensured that in the event of the occurrence of pressure peaks in the master brake cylinder, there is no risk of damage to the electromechanical braking device, for example, damage to the plastic teeth of the gear or another component of the electromechanical braking device. Thus, with the aid of the present invention, an electromechanical braking device may be implemented which has a service life/operating period which is increased with respect to the related art.

In one advantageous specific embodiment of the electromechanical braking device, the pressure peaks (to be attenuated) in the master brake cylinder, as of which the at least one elastic component is compressible, are above a predefined (predeterminable) threshold value and/or correspond to a predefined (predeterminable) minimum pressure increase within a predefined (predeterminable) time interval. For example, the pressure peaks in the master brake cylinder, as of which the at least one elastic component is compressible, may be above a threshold value of 80 bar. The pressure peaks may be above a threshold value of 100 bar, in particular above a threshold value of 120 bar, likewise above a threshold value of 150 bar. For the minimum pressure increase, values of 50 bar, 80 bar, 100 bar, 120 bar, or 150 bar may be used. The predefined time interval may be between 10 ms and 100 ms. Thus, not only a predefined force level (or pressure level) may be used to characterize pressure peaks, but also a kinetic energy (power/pressure and associated gradient) may be introduced into the gear. In both cases, it is ensured that the electromechanical braking device has an advantageously high rigidity below the control point of the electromechanical braking device, while the electromechanical braking device behaves elastically during a recirculation, in particular during pressure peaks caused by the pulsations of the pumps. The values used for characterizing the pressure peaks to be attenuated may be chosen according to the configuration of the control point of the brake booster.

The electromechanical braking device may, for example, be configured as an automatic braking device and/or power braking device. Such an automatic braking device and/or power braking device may be used by a driver to reduce a speed of a vehicle which is equipped with it, without operating a brake actuating element, for example, a brake pedal. The electromechanical braking device may thus be used for a plurality of advantageous automatic braking devices and/or power braking devices.

In one additional advantageous specific embodiment, the electromechanical braking device is configured as an electromechanical brake booster. Compared to a vacuum booster, such an electromechanical brake booster has a better controllability of the supporting force provided with the aid of the brake booster. In addition, the electromechanical brake booster according to the present invention has an advantageously high elasticity in the event of an occurrence of pressure peaks in the master brake cylinder.

For example, with the aid of a compression of the at least one elastic component during the occurrence of pressure peaks in the master brake cylinder, a force may be transmitted to an input rod of the electromechanical braking device in such a way that the input rod is adjustable in a direction oriented away from the master brake cylinder. The adjusting motion of the input rod oriented away from the master brake cylinder which is achievable in this way generally results in the driver briefly reducing the driver braking force applied to a brake pedal which is linked to the input rod. Such a reduction of the driver braking force in turn results in a reversal of the electric motor, whereby damage of a component of the electromechanical brake booster is additionally counteracted.

In one specific embodiment, the at least one elastic component includes a disk spring which is situated between a boost body of the electromechanical brake booster and a valve body of the electromechanical brake booster. Thus, an economical component may be used which has a lower installation space requirement than the at least one elastic component.

The disk spring may have a linear displacement/force spring constant. As an alternative thereto, the disk spring may also have a progressive displacement/force spring constant. Thus, a plurality of different types of disk springs may be used to implement the electromechanical braking device.

In one additional specific embodiment, the at least one elastic component includes a sliding sleeve, the valve body of the electromechanical brake booster protruding into its inner opening. In addition, the sliding sleeve may support itself on a ring on its side which is oriented away from the output rod, an adjustment motion of the ring in an adjustment direction oriented toward the output rod being limited with the aid of a retaining ring secured to the boost body of the electromechanical brake booster, and the ring being supported by the boost body on its side oriented away from the output rod with the aid of a pre-stressed spring. The specific embodiment described here may also be provided in a simple manner with the aid of economical components. In addition, in this case as well, the configuration of the at least one elastic component is associated with no increase of the installation space requirement of the electromechanical braking device.

The advantages listed above are also ensured in a braking system for a vehicle including a corresponding electromechanical braking device and a master brake cylinder.

Additional features and advantages of the present invention will be explained below based on the figures.

DETAILED DESCRIPTION

Figure 1:
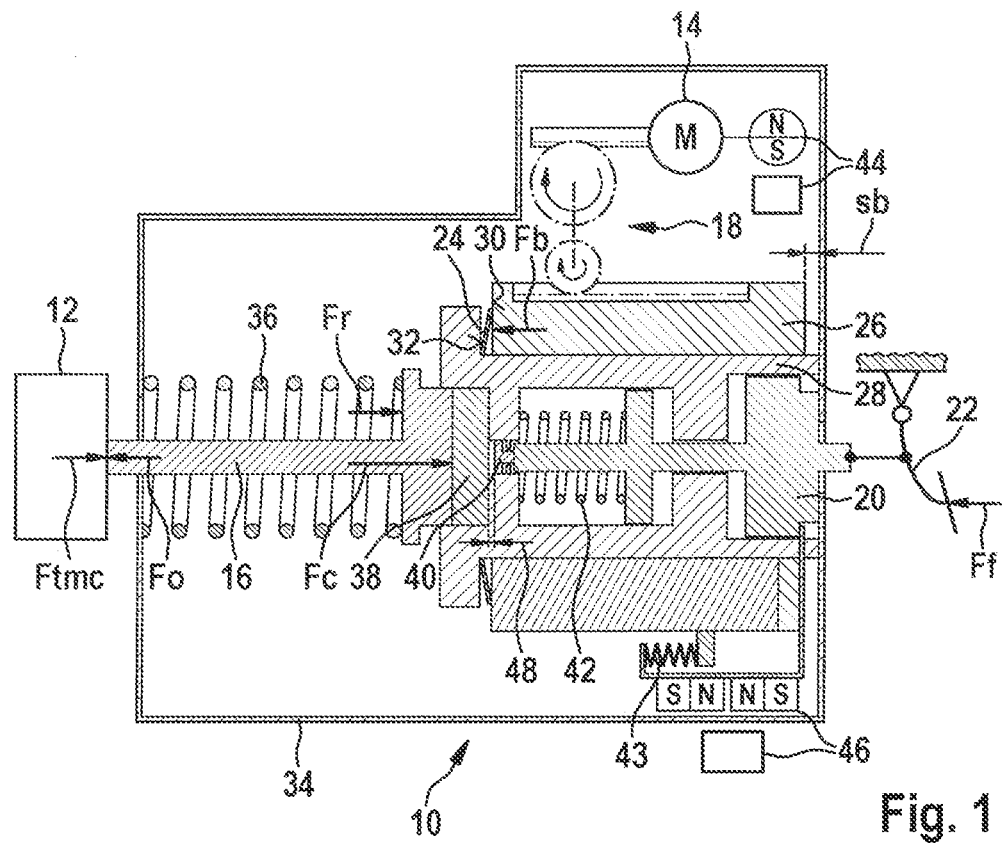
FIG. 1 shows a schematic representation of a first specific embodiment of the electromechanical braking device.

FIG. 1 shows a schematic representation of a first specific embodiment of the electromechanical braking device.

Electromechanical braking device 10 schematically represented in FIG. 1 is configured for use in a braking system including a master brake cylinder 12. Electromechanical braking device 10 may interact with a plurality of different types of master brake cylinders 12. For example, master brake cylinder 12 may be a tandem master brake cylinder or a master brake cylinder having only one pressure chamber.

Electromechanical braking device 10 includes an electric motor 14. Since a plurality of different types of electric motors 14 may be used for electromechanical braking device 10, electric motor 14 of the specific embodiment of FIG. 1 will not be discussed in greater detail. In addition, electromechanical braking device 10 includes an adjustable output rod 16. Output rod 16 is situatable on master brake cylinder 12 in such a way that at least one (not shown) piston of master brake cylinder 12 is also adjustable with the aid of adjusted output rod 16. In this way, a volume of at least one chamber of master brake cylinder 12 which is delimited with the aid of the at least one piston may be reduced, whereby an internal pressure present in master brake cylinder 12 may be increased.

Electric motor 14 provides its motor output up to a so-called control point of electromechanical braking device 10 in such a way that the internal pressure present in the at least one chamber of master brake cylinder 12 may be increased with the aid of the motor output transmitted to output rod 16. In the specific embodiment of FIG. 1, electromechanical braking device 10 is configured as an electromechanical brake booster 10. The motor output of electric motor 14 may thus be used as an assistance force Fb for additionally increasing the internal pressure present in the at least one chamber of master brake cylinder 12. In this way, it is possible to assist the driver in terms of force during a pressure build-up in master brake cylinder 12.

Electromechanical braking device 10 of FIG. 1 therefore implements an electromechanical brake boost. In particular, the electromechanical brake boost may be position-controlled. This may be understood to mean that assistance force Fb/a setpoint angle of rotation (of the rotor) of electric motor 14 is predefined by a controller of electromechanical braking device 10, taking into consideration an ascertained adjustment travel of at least one driver braking force transmission component, for example, an input rod 20. Alternatively, the rotation to be carried out by the rotor of electric motor 14 may be established, also taking into consideration a driver braking force Ff exerted on a brake actuating element 22, for example, a brake pedal 22. However, it should be noted that a configuration of electromechanical braking device 10 as an electromechanical brake booster 10, in particular as a certain type of an electromechanical brake booster 10, is merely optional.

Electromechanical braking device 10 also includes at least one gear 18, electric motor 14 being connected to output 16 at least via gear 18 in such a way that a power transmission path is present, via which a motor output/assistance force Fb applied by electric motor 14 is at least partially transmittable to output rod 16. Output rod 16 is thus adjustable with the aid of the at least partially transmittable motor output/assistance force Fb. Gear 18 may be described in particular as a rotation-to-translation conversion gear, with the aid of which a rotary motion of a rotor of electric motor 14 may be converted into a translational motion of output rod 16. In addition to gear 18, additional components of the electromechanical braking device may be used for implementing the desired power transmission path, as described below in greater detail.

The electromechanical braking device also includes at least one elastic component 24 situated within the power transmission path. The at least one elastic component 24 may be understood to mean an elastic component which is configured in such a way that the at least one elastic component 24 is not compressible below the control point of electromechanical braking device 10. However, if pressure peaks occur in master brake cylinder 12 which are above the control point of electromechanical braking device 10, the at least one elastic component 24 is compressible. This compressibility of the at least one elastic component 24 during pressure peaks in master brake cylinder 12 above the control point of electromechanical braking device 10 makes it possible to dampen an abrupt/sudden increase of a master brake cylinder force Ftmc counteracting the braking motion of output rod 16 in master brake cylinder 12, which would otherwise at least partially affect gear 18 via output rod 16.

In this way, it is possible to reliably counteract damage to at least one component of electromechanical braking device 10 due to the abrupt increase in master brake cylinder force Ftmc, in particular damage to gear 18. Electromechanical braking device 10 equipped with the at least one elastic component 24 therefore has a comparatively long service life/operating period without the risk of damage due to pressure peaks in master brake cylinder 12.

The pressure peaks in master brake cylinder 12, as of which the at least one elastic component 24 is compressible, may be above a predefined (determinable) threshold value and/or correspond to a predefined (determinable) minimum pressure increase within a predefined (determinable) time interval. For example, the pressure peaks in master brake cylinder 12, as of which the at least one elastic component 24 is compressible, may be above a threshold value of 80 bar. The pressure peaks may be above a threshold value of 100 bar, in particular above a threshold value of 120 bar, likewise above a threshold value of 150 bar. Values of 50 bar, 80 bar, 100 bar, 120 bar, or 150 bar may be used for the minimum pressure increase. The predefined time interval may be between 10 ms and 100 ms. The threshold value for the pressure peaks in master brake cylinder 12, as of which the at least one elastic component 24 is compressible, may be easily and reliably determined with the aid of a construction of the at least one elastic component 24.

Thus, not only a predefined force level (or pressure level) may be used to characterize pressure peaks, but also a kinetic energy (power/pressure and associated gradient) may be introduced into the gear.

In both cases, it is ensured that the electromechanical braking device has an advantageously high rigidity below the control point of the electromechanical braking device, while the electromechanical braking device behaves elastically during a recirculation, in particular during pressure peaks effectuated by the pulsations of the pumps. The values used for characterizing the pressure peaks to be attenuated may be chosen according to the configuration of the control point of the brake booster.

It should be mentioned that the damping of the abruptly increasing master brake cylinder force Ftmc which may be effectuated with the aid of the at least one elastic component may be implemented by a purely mechanical arrangement. Thus, the increase in the service life/operating period of electromechanical braking device 10 which may be ensured in this manner is possible at low cost. In particular, by equipping electromechanical braking device 10 with the at least one advantageously configured elastic component 24, it is possible to omit a damping of the pressure peaks with the aid of a software component configured for this purpose. Since such a software component generally requires a measurement of the internal pressure in master brake cylinder 12 having a high time resolution and/or a rapid identification of an ABS flag, these complex measurement steps may be eliminated in the case of a use of the at least one elastic component 24. The damping implemented with the aid of the at least one elastic component 24 may thus omit a use of expensive sensors or a complex (because it is sufficiently rapid) communication with a control device including a pressure sensor.

In addition, equipping electromechanical braking device 10 with the at least one elastic component reliably ensures that its deformation occurs in a timely manner and rapidly enough in response to the abrupt increase in the master brake cylinder force Ftmc. The problems of latency time which occur in master brake cylinder 12 in the case of a conventional software component for cushioning pressure peaks are thus omitted.

With the aid of the advantageous configuration of the at least one elastic component 24, it is also feasible that when pressure peaks occur in master brake cylinder 12, a force may be transmitted to input rod 20 of electromechanical braking device 10 with the aid of a compression of the at least one elastic component 24 in such a way that input rod 20 is adjustable in a direction oriented away from master brake cylinder 12. The driver thus notices an amplified effect counteracting his/her application of braking actuating element 22. In such a situation, the driver generally responds to such a situation by reducing driver braking force Ff or initiating a slight reverse adjustment of brake actuating element 22. In a configuration of electromechanical braking device 10 as a position-controlled electromechanical brake booster 10, the response of the driver triggers a slight reduction in speed of the rotor of electric motor 14, thus also making it possible to relax gear 18 during the occurrence of the pressure peaks. Thus, due to its compression, the at least one elastic component 24 not only effectuates a brief reduction of the internal pressure present in master brake cylinder 12, but also an at least slight decrease in the motor operation of electric motor 14. With the aid of both actions, damage to electromechanical braking device 10, in particular gear 18, which is triggered by the abrupt increase in the master brake cylinder force Ftmc, may be successfully counteracted.

In the specific embodiment of FIG. 1, the at least one elastic component 24 is a disk spring 24 which is situated between a boost body 26 of electromechanical brake booster 10 and a valve body 28 of the electromechanical brake booster. Disk spring 24 may in particular be situated between a first force transmission area 30 of boost body 26 which is oriented toward master brake cylinder 12 in a braking direction and a second force transmission area 32 of valve body 28 facing first force transmission area 30. Force transmission areas 30 and 32 may carry or guide disk spring 24 in the form of two hardened washer disks having appropriate strength and sliding surfaces.

A disk spring 24 is one economical specific embodiment of the at least one elastic component 24. In addition, a disk spring 24 has a comparatively small installation space requirement. Generally, it is possible to omit a pre-stressing of the disk spring for its applicability in the at least one electromechanical braking device 10. Disk spring 24 may be specifically configured for a comparatively high load. A configuration of disk spring 24 for the comparatively high load generally has no effect on the brake application feel (pedal feel) of the driver during the application of brake actuating element 22 in the jump-in and below the control point.

Disk spring 24 may have a linear displacement/force spring constant. As an alternative, disk spring 24 may also be configured to have a progressive displacement/force spring constant. At a diameter of master brake cylinder 12 of 25.4 mm and a volume intake of the braking system of 9.2 cm$^3$ at 160 bar for a volume reduction at the brakes of the front axle and the rear axle from 160 bar to 120 bar (which makes a volume displacement of 1.5 cm$^3$ necessary), a displacement of disk spring 24 of approximately 2.9 mm is sufficient. Such a compression of disk spring 24 may already be implemented with the aid of an economical disk spring 24.

In addition to its components already described above, electromechanical braking device 10 shown in FIG. 1 includes a housing 34 and a return spring 36, with the aid of which output rod 16 supports itself on housing 34. The transmission of assistance force Fb from valve body 28 to output rod 16 occurs via a reaction disk 38 of electromechanical braking device 10. The transmission of driver braking force Ff from input rod 20 to output rod 16 is also carried out via reaction disk 38, a tablet 40, which is situated on an end of input rod 20 oriented toward output rod 16 and which is guidable through an opening formed in valve body 28, being able to contact reaction disk 38. Thus, output force Fo transmitted via output rod 16 to at least one adjustable piston of master brake cylinder 12 may be a sum of assistance force Fb and driver braking force Ff. (Output force Fo is generally equal to master brake cylinder force Ftmc.) Correspondingly, a counterforce Fc exerted by output rod 16 on reaction disk 38 may be a sum of return force Fr of return spring 36 and output force Fo. In addition, input rod 20 may support itself on valve body 28 with the aid of an intermediate spring 42. Boost body 26 may also support itself on input rod 20 with the aid of an additional spring 43. However, equipping electromechanical braking device 10 with components 34 through 43 listed here is optional.

In addition, the electromechanical braking device may also be equipped with a rotor position sensor 44 for monitoring the functionality of electric motor 14, a displacement sensor (not shown) for ascertaining an adjustment travel of input rod 20 from its non-actuated initial position, and/or a differential travel sensor 46 for ascertaining a differential travel between input rod 20 and boost body 26. Thus, the (absolute) adjustment travel of input rod 20, an (absolute) adjustment travel sb of boost body 26, the differential travel between input rod 20 and boost body 26, and a gap 48 possibly present between tablet 40 and reaction disk 38 may be precisely adjustable.

Electromechanical braking device 10 thus combines the advantages of an advantageously low rigidity during the occurrence of pressure peaks in master brake cylinder 12, which is comparable to a conventional vacuum brake booster, with a controllability of output force Fo which is improved with respect to a vacuum brake booster.

Figure 2:
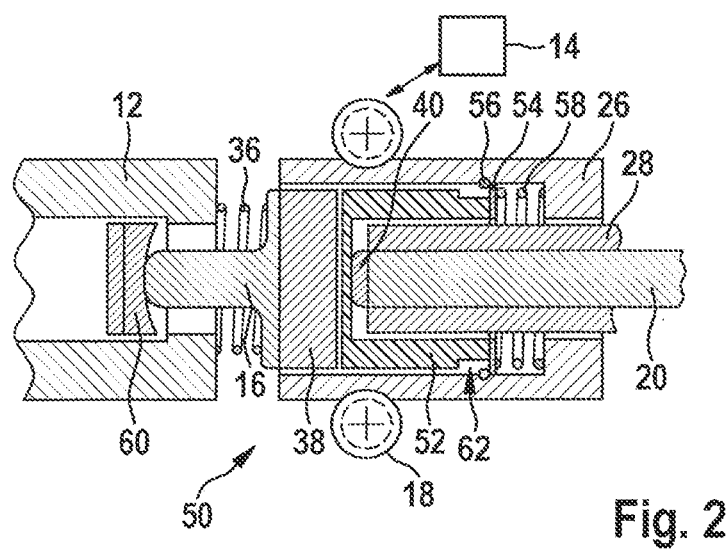
FIG. 2 shows a schematic representation of a second specific embodiment of the electromechanical braking device.

FIG. 2 shows a schematic representation of a second specific embodiment of the electromechanical braking device.

Electromechanical braking device 50 schematically represented in FIG. 2 is also configured as an electromechanical brake booster 50. As the at least one elastic component 52 through 58, electromechanical braking device 50 of FIG. 2 includes a sliding sleeve 52, valve body 28 protruding into its inner opening. Sliding sleeve 52 supports itself on a ring 54 which is axially movable along valve body 28, on a side oriented away from output rod 16. However, an adjustment movement of ring 54 in an adjustment direction which is oriented toward output rod 16 is limited with the aid of a retaining ring 56 which is secured to boost body 26. In addition, ring 54 is supported by boost body 26 on its side oriented away from output rod 16 with the aid of a pre-stressed spring 58.

During normal operation of electromechanical brake booster 50, the force for transmitting assistance force Fb flows through pre-stressed spring 58 without a compression of pre-stressed spring 58 occurring. Thus, pre-stressed spring 58 behaves like a passive element in such a situation. Therefore, during normal operation of electromechanical brake booster 50, the assistance force may be directed to reaction disk 38 via boost body 26, retaining ring 56, pre-stressed spring 58, ring 54, and sliding sleeve 52. A yielding of pre-stressed spring 58 is prevented up to the control point of electromechanical braking device 50 by configuration. No changes of the output force transmitted to the at least one piston 60 of master brake cylinder 12 or the adjustment travel of output rod 16 result due to the additional equipping of electromechanical braking device 50 with components 52 through 58.

However, pressure peaks may occur in master brake cylinder 12. For example, if an increased wheel slip of one or multiple wheels is identified, a pressure reduction may be carried out in at least one wheel braking cylinder which is hydraulically connected to master brake cylinder 12 by closing at least one associated intake valve and opening at least one associated outlet valve. In this way, the brake fluid from the at least one wheel brake cylinder is dischargeable into the at least one storage chamber of at least one brake circuit which is connected to master brake cylinder 12, so that a blockage of at least one wheel may be eliminated. In order to stabilize the volume management in the at least one brake circuit, the previously discharged volume may be pumped from the at least one storage chamber into master brake cylinder 12 with the aid of at least one return pump. This may effectuate an abrupt increase of the internal pressure present in master brake cylinder 12.

The sharp increase of the internal pressure present in the master brake cylinder causes the "normal" assistance force level to be exceeded. In this case, an abrupt increase of the master brake cylinder force results in a significantly increased pressure of ring 54 against pre-stressed spring 58, and ultimately a yielding of pre-stressed spring 58. Ring 54 is thus displaced axially away from output rod 16, which results in a deflection of retaining sleeve 52. (In such a situation, the position of retaining ring 56 does not change due to the inertia of boost body 26; however, sliding sleeve 52 may include a notch 62 on an end facing retaining ring 56.)

The yielding of pre-stressed spring 58 or the deflection of retaining sleeve 52 makes it possible to decrease an overall rigidity of electromechanical braking device 50 at least briefly. Thus, it is possible to increase volume briefly, despite an increased inertia of electromechanical braking device 50 (in comparison to a vacuum brake booster), whereby the internal pressure in master brake cylinder 12 may be slightly decreased.

In addition, the yielding of pre-stressed spring 58 or the deflection of retaining sleeve 52 results in an increased force component being transmitted to the brake actuating element via input rod 20. (In such a situation, a support of reaction disk 38 yields somewhat.) The driver thus notices an increased counterforce at the brake actuating element and generally reduces the brake application in response. The response of the driver in turn triggers a slight return of boost body 26 with the aid of position-controlled electric motor 14, whereby the internal pressure present in master brake cylinder 12 may additionally be slightly reduced, and gear 18 is further relievable.

With the aid of elastic components 52 through 58, it may thus be prevented that during pressure peaks in master brake cylinder 12, significant loads occur in gear 18. Instead, the retroaction of the pressure peaks on gear 18 may be dampened via a yielding/a compression of pre-stressed spring 58. Thus, despite a use of a gear 18 having a high rigidity, damage to it may be prevented in the event of pressure peaks in master brake cylinder 12. An economical gear 18 may therefore also be used for electromechanical braking device 50. In addition, a row of teeth may be formed on boost body 26 from an economical plastic without the risk of damage to the row of teeth.

The prestressing of pre-stressed spring 58 is advantageously chosen in such a way that the pre-stressing force barely exceeds the maximum assistance force. In this way, it may be ensured that in the case of a slow brake application by the driver, the internal pressure in master brake cylinder 12 may also rise above the level of the control point. Although the maximum providable assistance force is limited by the control point, the driver is still able to increase the internal pressure present in master brake cylinder 12 via an increased driver braking force. In such a situation, pre-stressed spring 58 does not yield.

At least one internal part of boost body 26 may be made of metal. Sliding sleeve 52 may be made of plastic. Steel may be used for ring 54 and the pre-stressed spring. However, the additional costs arising for boost body 56 may be compensated for by a more economically usable gear 18.

In the specific embodiments mentioned above, electromechanical braking devices 10 and 50 are configured as electromechanical brake boosters. As an alternative thereto, an advantageous electromechanical braking device may also be configured as an automatic braking device and/or power braking device, for example, for an ACC system.

The advantages listed above are also implemented in a braking system for a vehicle having such an electromechanical braking device 10 and 50 and a master brake cylinder 12.

What is claimed is:

1. An electromechanical braking device for a braking system including a master brake cylinder, comprising:
   an electric motor;
   an adjustable output rod which is arrangeable on the master brake cylinder so that at least one piston of the master brake cylinder is adjustable with the adjusted output rod;
   a gear, the electric motor being connected to the output rod at least via the gear so that a power transmission path is present, via which a motor output applied by the electric motor is at least partially transmittable to the output rod so that the output rod is adjustable with the at least partially transmittable motor output;
   at least one elastic component situated within the power transmission path which is configured so that the at least one elastic component is not compressible below a control point of the electromechanical braking device, but during an occurrence of pressure peaks in the master brake cylinder which are above the control point of the electromechanical braking device, the at least one elastic component is compressible;
   a reaction disk, the reaction disk situated to transmit a force from an input rod of the electromechanical braking device to the output rod;
   wherein the at last one elastic component includes a sliding sleeve, the sliding sleeve situated on a side of the reaction disk that faces the input rod, the force from the input rod being transmitted to the reaction disk via the sliding sleeve.

2. The electromechanical braking device of claim 1, wherein the pressure peaks in the master brake cylinder, as of which the at least one elastic component is compressible, are above a predefined threshold value and/or correspond to a predefined minimum pressure increase within a predefined time interval.

3. The electromechanical braking device of claim 1, wherein the electromechanical braking device includes an automatic braking device and/or power braking device.

4. The electromechanical braking device of claim 1, wherein the electromechanical braking device includes an electromechanical brake booster.

5. The electromechanical braking device of claim 4, wherein with the compression of the at least one elastic component during the occurrence of pressure peaks in the master brake cylinder, a force is transmittable to the input rod of the electromechanical braking device so that the input rod is adjustable in a direction oriented away from the master brake cylinder.

6. The electromechanical braking device according to claim 4, wherein a boost body of the electromechanical brake booster transmits a force to the output rod via the sliding sleeve and the reaction disk.

7. The electromechanical braking device according to claim 4, wherein the at least one elastic component further includes a prestressed spring situated on a side of the sliding sleeve that faces away from the output rod, the force from the input rod flowing through the prestressed spring without a compression of the prestressed spring.

8. An electromechanical braking device for a braking system including a master brake cylinder, comprising:
   an electric motor;
   an adjustable output rod which is arrangeable on the master brake cylinder so that at least one piston of the master brake cylinder is adjustable with the adjusted output rod;
   a gear, the electric motor being connected to the output rod at least via the gear so that a power transmission path is present, via which a motor output applied by the electric motor is at least partially transmittable to the output rod so that the output rod is adjustable with the at least partially transmittable motor output; and
   at least one elastic component situated within the power transmission path which is configured so that the at least one elastic component is not compressible below a control point of the electromechanical braking device, but during an occurrence of pressure peaks in the master brake cylinder which are above the control point of the electromechanical braking device, the at least one elastic component is compressible;
   wherein the electromechanical braking device includes an electromechanical brake booster;
   wherein the at least one elastic component includes a sliding sleeve; and
   wherein the sliding sleeve is supported on a ring on a side of the sliding sleeve which is oriented away from the output rod, and an adjustment motion of the ring in an adjustment direction oriented toward the output rod is limited with the aid of a retaining ring secured to a boost body of the electromechanical brake booster, and the ring is supported by the boost body on a side of the ring oriented away from the output rod with a prestressed spring.

9. The electromechanical braking device according to claim 8, wherein a valve body of the electromechanical brake booster protrudes into an inner opening of the sliding sleeve.

10. The electromechanical braking device according to claim 8, wherein the at least one elastic component further includes a prestressed spring situated on a side of the sliding sleeve that faces away from the output rod, the force from the input rod flowing through the prestressed spring without a compression of the prestressed spring.

11. The braking system for a vehicle, comprising:
   a master brake cylinder; and
   an electromechanical braking device for the master brake cylinder, including:
     an electric motor;
     an adjustable output rod which is arrangeable on the master brake cylinder so that at least one piston of the master brake cylinder is adjustable with the adjusted output rod;
     a gear, the electric motor being connected to the output rod at least via the gear so that a power transmission path is present, via which a motor output applied by the electric motor is at least partially transmittable to the output rod so that the output rod is adjustable with the at least partially transmittable motor output;
     at least one elastic component situated within the power transmission path which is configured so that the at least one elastic component is not compressible below a control point of the electromechanical braking device, but during an occurrence of pressure peaks in the master brake cylinder which are above the control point of the electromechanical braking device, the at least one elastic component is compressible; and
     a reaction disk, the reaction disk situated to transmit a force from an input rod of the electromechanical braking device to the output rod;
     wherein the at last one elastic component includes a sliding sleeve, the sliding sleeve situated on a side of the reaction disk that faces the input rod, the force from the input rod being transmitted to the reaction disk via the sliding sleeve.

12. The braking system according to claim 11, wherein the electromechanical braking device includes an electromechanical brake booster, a boost body of the electromechanical brake booster transmits a force to the output rod via the sliding sleeve and the reaction disk.

13. The braking system according to claim 11, wherein the at least one elastic component further includes a prestressed spring situated on a side of the sliding sleeve that faces away from the output rod, the force from the input rod flowing through the prestressed spring without a compression of the prestressed spring.

* * * * *